3,457,276
1-p-CHLOROBENZOYL-2-METHYL-3-(2'-PROPANONE)-INDOLES

John Martin Chemerda, Watchung, and Meyer Sletzinger, North Plainfield, N.J., assignors to Merck & Co., Inc., Rahway, N.J., a corporation of New Jersey
No Drawing. Filed July 26, 1967, Ser. No. 656,006
Int. Cl. C07d 27/56
U.S. Cl. 260—326.16     2 Claims

ABSTRACT OF THE DISCLOSURE

This invention relates to compounds of the formula

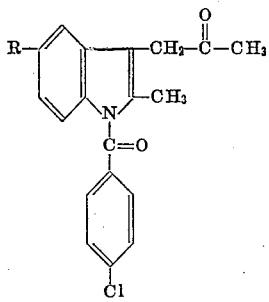

wherein R is either methoxy or dimethylamino, which are useful as intermediates in the preparation of 1-p-chlorobenzoyl-2-methyl-3-indolylacetic acids.

---

This invention relates to a new method of preparing certain 1-p-chlorobenzoyl-2-methyl-3-indolylacetic acids and to new intermediates therefor. More particularly, it relates to a method of preparing 1-p-chlorobenzoyl-2-methyl-3-indolylacetic acids of the Formula I:

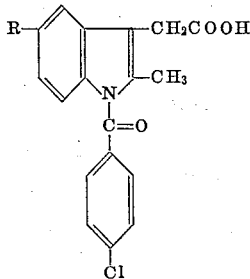

wherein R is either dimethylamino or methoxy. These compounds are disclosed and claimed in U.S. Patent No. 3,161,654, issued Dec. 15, 1964, to Shen. It relates further to the provision of new intermediates which are useful in the method of this invention.

In the Shen patent, 1-p-chlorobenzoyl-2-methyl-3-indolylacetic acids are prepared by a series of reactions in which a 3-indolylacetic acid is dehydrated to the corresponding anhydride; the anhydride is treated with t-butyl alcohol to give the corresponding ester; the t-butyl ester is then acylated at the 1-position with p-chlorobenzoyl chloride; and the resulting 1-acylate is converted to the free acetic acid derivative by a pyrolysis process. It is an object of this invention to provide an alternative route to the compounds of Formula I.

It has now been discovered in accordance with the present invention that compounds of Formula I can be prepared from a 1-p-chlorobenzoyl-2-methyl-3-(2'-propanone)-indole of the Formula II:

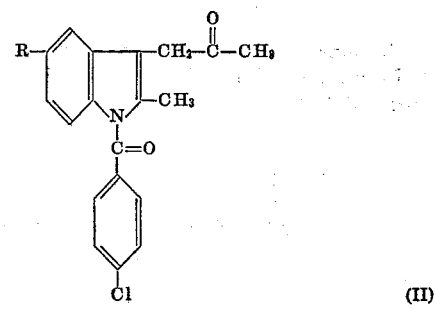

by a process which involves treating a compound of Formula II with an oxidizing agent capable of converting the 3-keto group to a carboxy group.

To practice the present invention, a 1-p-chlorobenzoyl-2-methyl-3-(2'-propanone)-indole is dissolved in a solvent such as dioxane, tetrahydrofuran, or dimethylsulfoxide, or the like, and then treated with an oxidizing agent such as an alkali metal hypohalite. The starting materials for this invention need not be pure. Thus, the propanone starting material of Formula II wherein R is dimethylamino may be admixed with some of the corresponding 3-propanol material and still be useful. Among the suitable oxidizing agents are sodium hypochlorite, sodium hypobromite and sodium hypoiodite. It is preferable to use an excess of the oxidizing agent over the indole starting material. The excess can be in the range of 10–20 mole percent. The mixture of the indole starting material and the oxidizing agent is stirred at about room temperature or slightly higher for about one hour. After this time, the excess oxidizing agent is removed or decomposed by treatment with an aqueous sodium bisulfite solution. Acidification of the reaction product with a strong acid such as hydrochloric acid and then extraction of the product with a solvent such as chloroform or methylene chloride, followed by washing and drying of the extracts, yields the desired products of Formula I in crude form. Recrystallization of the residue in a solvent such as t-butanol or tetrahydrofuran, yields the pure product.

The starting materials for the process of the present invention, i.e., the compounds of Formula II, are new compounds which are obtainable from the reaction of a para-substituted phenyl hydrazine salt and 2,5-hexanedione. The series of reactions leading to the starting materials of Formula II wherein R is methoxy is schematically outlined as follows:

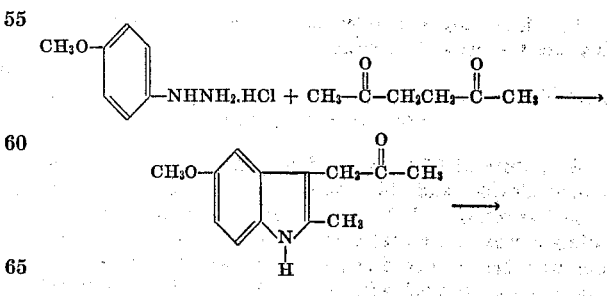

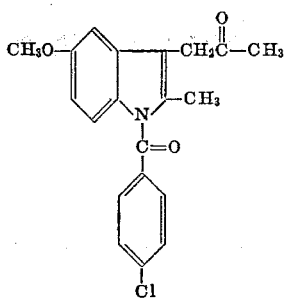

The series of reactions leading to the starting materials of Formula II wherein R is dimethylamino, is schematically outlined as follows:

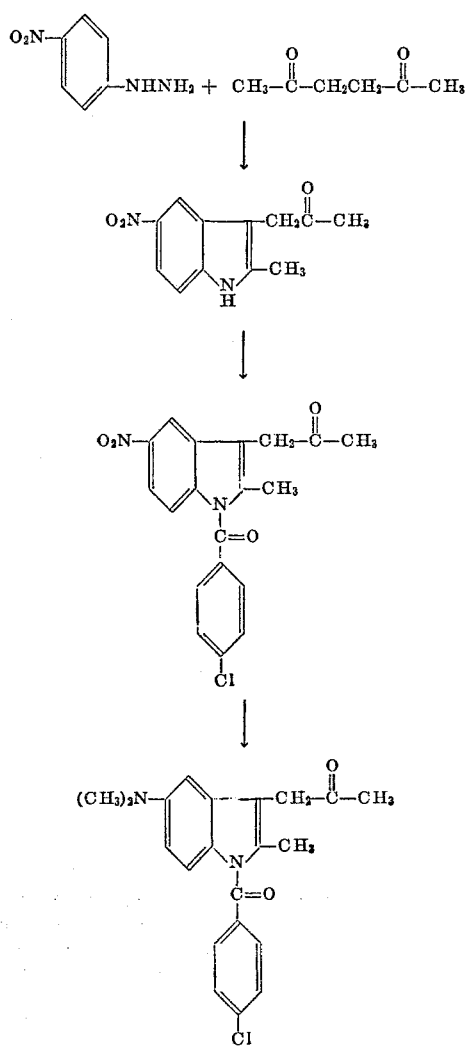

The following examples are presented to further illustrate the present invention.

EXAMPLE 1.—Preparation of 2-methyl-3-(2'-propanone)-5-methoxyindole

A mixture of 17.4 grams of p-methoxyphenylhydrazine hydrochloride and 14 grams of 2,5-hexanedione was heated at reflux in 100 ml. of t-butanol for six hours. The solution was concentrated to dryness in vacuo. The residue was then dissolved in chloroform and the chloroform solution was washed with water, dried and concentrated to give 2-methyl-3-(2'-propanone)-5-methoxyindole.

EXAMPLE 2.—Preparation of 1-p-chlorobenzoyl-2-methyl-3-(2'-propanone)-5-methoxyindole 2-methyl-3-(2'-propanone)-5-methoxyindole (5 grams) was dissolved in DMF containing 10% excess of sodium hydride. p-Chlorobenzoylchloride was slowly added to the slurry at 0–5° C. until 1.05 equivalents had been added to the slurry. The mixture was stirred at 0–5° C. for two hours. Slow addition of 100 ml. of 5% aqueous acetic acid decomposed the excess sodium hydride. The mixture was diluted with 100 ml. of water and extracted with chloroform. The chloroform extracts were washed with water and dried. Concentration of the extracts gave crude 1-p-chlorobenzoyl-2-methyl-3-(2'-propanone) - 5 - methoxyindole.

EXAMPLE 3

1-p-chlorobenzoyl-2-methyl-3-(2'-propanone)-5 - methoxyindole (2 grams) in 20 ml. of dioxane was treated with 10% excess sodium hypochlorite solution containing 2.0 grams of sodium hydroxide. The mixture was stirred at 35° C. for one hour. The excess hypochlorite was decomposed with 10% sodium bisulfite solution. The mixture was adjusted to pH 2 with hydrochloric acid. The mixture was then extracted with chloroform and the chloroform extracts were washed, dried, and concentrated. The crude 1-p-chlorobenzoyl-2-methyl-5-methoxy - 3 - indolylacetic acid was recrystallized by dissolving in t-butanol, heating with charcoal and filtering. Cooling afforded substantially pure 1-p-chlorobenzoyl-2-methyl-5-methoxy-3-indolylacetic acid.

The procedure of Example 3 yields the indentical product when sodium hypobromite or sodium hypoiodite is substituted for the hypochlorite used therein.

EXAMPLE 4.—Preparation of 2-methyl-3-(2'-propanone)-5-nitroindole

A mixture of p-nitrophenylhydrazine (15.3 g.) and 10.0 g. of 2,5-hexanedione was heated with 100 ml. of concentrated hydrochloric acid in a sealed tube for 18 hours at 60° C. The tube was opened and the insolubles filtered. The cake was dissolved in methylene chloride, dried and passed through a column of 50 g. of acid-washed alumina. The column was washed thoroughly with methylene chloride. The eluates were combined and concentrated to give 2-methyl-3-(2'-propanone)-5-nitroindole.

EXAMPLE 5.—Preparation of 1-p-chlorobenzoyl-2-methyl-3-(2'-propanone)-5-nitroindole A solution of 10.0 g. of 2-methyl-3-(2'-propanone)-5-nitroindole in 100 ml. of dimethylformamide (DMF) was added to a slurry of 1.05 molar equivalents of sodium hydride in 25 ml. of DMF. The mixture was stirred one hour and then 1.10 molar equivalents of chlorobenzoyl chloride added dropwise at 0–20° C. After stirring two hours at 20° C., 20 ml. of 5% aqueous acetic acid was added slowly. The mixture was diluted with water and extracted thoroughly with chloroform. The chloroform extracts were washed with water, dried and concentrated to give crude 1-p-chlorobenzoyl-2-methyl-3-(2'-propanone)-5-nitroindole.

EXAMPLE 6.—Preparation of 1-p-chlorobenzoyl-2-methyl-3-(2'-propanone)-5-dimethylaminoindole A mixture of 3.2 g. of 1-p-chlorobenzoyl-2-methyl-3-(2'-propanone)-5-nitroindole, 40 ml. of methanol, 17.2 ml. of acetic acid and 6.1 ml. of 36–38% formaldehyde was reduced at 40 p.s.i. at 50° using 2.1 g. of Raney nickel catalyst for 24 hours. The mixture was cooled and filtered with 200 ml. of toluene. The catalyst was separated by filtration and the filtrate washed with water, dried and concentrated to give 1-p-chlorobenzoyl-2-methyl-3-(2'- propanone)-5-dimethylaminoindole. The product contains 1-p-chlorobenzoyl-2-methyl-3(2'-propanol) - 5-dimethylamino-indole. The product can be resolved into its component parts by conventional chromatography over silica gel.

EXAMPLE 7

The product of Example 6, a mixture of 1-p-chlorobenzoyl-2-methyl-3-(2'-propanone)-5 - dimethylaminoindole and the 2'-propanol analog (2 grams) in 20 ml. of dioxane was treated with 10% excess sodium hypochlorite solution containing 2.0 grams of sodium hydroxide. The mixture was stirred at 35° C. for one hour. The excess hypochlorite was decomposed with 10% sodium bisulfite solution. The mixture was adjusted to pH 5 with hydrochloric acid. The mixture was then extracted with chloroform and the chloroform extracts were washed, dried, and concentrated. The crude 1-p-chlorobenzoyl-2-methyl-5-dimethylamino-3-indolylacetic acid was recrystallized by dissolving in t-butanol, heating with charcoal and filtering. Cooling afforded substantially pure 1-p-chlorobenzoyl-2-methyl-5-dimethylamino-3 - indolyacetic acid.

The procedure of Example 7 yields the identical product when sodium hypobromite or sodium hypoiodite is substituted for the hypochlorite used therein. The same product is obtained when the starting material for Example 7 is substantially pure 1-p-chlorobenzoyl-2-methyl-3-(2'-propanone)-5-dimethylaminoindole.

We claim:
1. A compound of the formula:

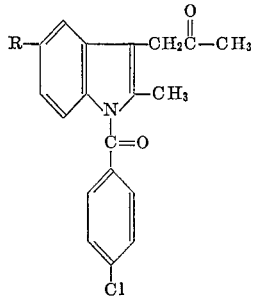

wherein R is either methoxy or dimethylamino.
2. The compound of claim 1 wherein R is methoxy.

References Cited
UNITED STATES PATENTS
3,072,530  1/1963  Hofmann et al. _ 260—326.13 XR ALEX MAZEL, Primary Examiner J. A. NARCAVAGE, Assistant Examiner U.S. Cl. X.R.

260 –326.13, 326.14, 326.15